United States Patent
Singh et al.

(10) Patent No.: US 12,284,271 B2
(45) Date of Patent: Apr. 22, 2025

(54) SYSTEMS AND TECHNIQUES FOR AUTHENTICATION AND SECURITY

(71) Applicant: QUALCOMM Incorporated, San Diego, CA (US)

(72) Inventors: Pruthvi Raj Singh, Hyderabad (IN); Vishnu Vardhan Kasilya Sudarsan, Bangalore (IN); Srivathsa Sridhara, Bhadravathi (IN); Rameshkumar Karuppusamy, Tirupur (IN)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/858,910

(22) Filed: Jul. 6, 2022

(65) Prior Publication Data

US 2024/0015007 A1   Jan. 11, 2024

(51) Int. Cl.
    *H04L 9/08*   (2006.01)
    *H04L 9/06*   (2006.01)
    *H04M 7/12*   (2006.01)

(52) U.S. Cl.
    CPC .......... *H04L 9/0825* (2013.01); *H04L 9/0643* (2013.01); *H04L 9/0869* (2013.01); *H04M 7/1295* (2013.01)

(58) Field of Classification Search
    CPC ... H04L 9/0825; H04L 9/0643; H04L 9/0869; H04M 7/1295
    USPC ........................................................ 713/171
    See application file for complete search history.

(56) References Cited

U.S. PATENT DOCUMENTS

| | | | | |
|---|---|---|---|---|
| 6,834,112 B1* | 12/2004 | Brickell | ............... | H04L 9/3236 380/279 |
| 7,434,052 B1* | 10/2008 | Rump | ............... | H04N 21/26613 713/160 |
| 7,840,805 B2* | 11/2010 | Maillard | ............... | H04N 5/913 713/168 |
| 8,219,392 B2* | 7/2012 | Manjunath | ............... | G10L 19/18 370/538 |
| 8,823,494 B1* | 9/2014 | Kovitz | ............... | H04W 12/50 398/128 |
| 10,111,078 B2* | 10/2018 | Gellens | ............... | H04L 61/5007 |
| 10,887,764 B1* | 1/2021 | Mokady | ............... | H04W 4/14 |
| 10,957,328 B2* | 3/2021 | Page | ............... | G06F 21/32 |
| 2008/0268776 A1 | 10/2008 | Amendola | | |
| 2010/0227549 A1* | 9/2010 | Kozlay | ............... | H04W 12/50 455/26.1 |

(Continued)

OTHER PUBLICATIONS

International Search Report and Written Opinion—PCT/US2023/069098—ISA/EPO—Oct. 5, 2023.

*Primary Examiner* — Badrinarayanan
(74) *Attorney, Agent, or Firm* — Polsinelli

(57) ABSTRACT

The present disclosure generally relates to wireless communication. Some aspects of the present disclosure include systems and techniques for device authentication. For example, an apparatus for wireless communication may receive, via a microphone, an audio signal from a second device. The apparatus may decode the audio signal to determine an encoded value. The apparatus may further determine that the audio signal is associated with the second device based on the encoded value. The apparatus may further establish a connection to the second device based on determining that the audio signal is associated with the second device.

26 Claims, 8 Drawing Sheets

(56) References Cited

U.S. PATENT DOCUMENTS

| | | | |
|---|---|---|---|
| 2010/0248687 A1* | 9/2010 | Barsoum | H04M 7/1295 |
| | | | 455/410 |
| 2011/0154042 A1* | 6/2011 | Gremaud | H04N 21/4181 |
| | | | 713/171 |
| 2015/0099466 A1 | 4/2015 | Narendra et al. | |
| 2018/0367309 A1* | 12/2018 | Reinhold | H04L 9/0662 |
| 2020/0304992 A1* | 9/2020 | Fukazawa | H04L 65/4061 |
| 2022/0254488 A1* | 8/2022 | Locke | H04L 67/12 |
| 2022/0345227 A1* | 10/2022 | Suryanarayana | H04B 11/00 |

* cited by examiner

600 ⟶

```
┌─────────────────────────────────────────┐
│ Receive, Via A Microphone, An Audio     │
│ Signal From A Second Device             │
│                  602                    │
└─────────────────────────────────────────┘
                    │
                    ▼
┌─────────────────────────────────────────┐
│ Decode The Audio Signal To Determine    │
│ An Encoded Value                        │
│                  604                    │
└─────────────────────────────────────────┘
                    │
                    ▼
┌─────────────────────────────────────────┐
│ Determine That The Audio Signal Is      │
│ Associated With The Second Device       │
│ Based On The Encoded Value              │
│                  606                    │
└─────────────────────────────────────────┘
                    │
                    ▼
┌─────────────────────────────────────────┐
│ Establish A Connection To The Second    │
│ Device Based On Determining That The    │
│ Audio Signal Is Associated With The     │
│ Second Device                           │
│                  608                    │
└─────────────────────────────────────────┘
```

FIG. 6

SYSTEMS AND TECHNIQUES FOR AUTHENTICATION AND SECURITY

FIELD

The present disclosure generally relates to wireless communication. Some aspects of the present disclosure include systems and techniques for device authentication.

BACKGROUND

Bluetooth is a short-range wireless technology standard used to exchange data between fixed and mobile devices. A wireless connection may be used as an alternative to wired connections to exchange files between nearby portable devices and connect cell phones and music players with wireless headphones. Some wireless technologies such as Bluetooth use a pairing process to bond source and sink devices. A specific request from a user may trigger the pairing process. The two devices establish a relationship during pairing by creating a shared secret known as a link key. If both devices store the same link key, they are said to be paired or bonded.

SUMMARY

Certain aspects of the present disclosure are directed towards an apparatus for wireless communication. The apparatus generally includes at least one memory; and one or more processors coupled to the at least one memory and configured to: receive, via a microphone, an audio signal from a device; decode the audio signal to determine an encoded value; determine that the audio signal is associated with the device based on the encoded value; and establish a connection to the device based on determining that the audio signal is associated with the device.

Certain aspects of the present disclosure are directed towards a method for wireless communication by a first device. The method generally includes: receiving, via a microphone, an audio signal from a second device; decoding the audio signal to determine an encoded value; determining that the audio signal is associated with the second device based on the encoded value; and establishing a connection to the second device based on determining that the audio signal is associated with the second device.

Certain aspects of the present disclosure are directed towards a non-transitory computer-readable medium having stored thereon instructions that, when executed by one or more processors, cause the one or more processors to: receive, via a microphone, an audio signal from a device; decode the audio signal to determine an encoded value; determine that the audio signal is associated with the device based on the encoded value; and establish a connection to the device based on determining that the audio signal is associated with the device.

Certain aspects of the present disclosure are directed towards an apparatus for wireless communication comprising: means for receiving, via a microphone, an audio signal from a device; means for decoding the audio signal to determine an encoded value; means for determining that the audio signal is associated with the device based on the encoded value; and means for establishing a connection to the device based on determining that the audio signal is associated with the device.

Certain aspects of the present disclosure are directed towards an apparatus for wireless communication by a first device. The apparatus generally includes at least one memory; and one or more processors coupled to the at least one memory and configured to: determine an audio signal; output the audio signal; and establish a connection to a second device in response to outputting the audio signal.

Certain aspects of the present disclosure are directed towards a method for wireless communication by a first device. The method generally includes: determining an audio signal; outputting the audio signal; and establishing a connection to a second device in response to outputting the audio signal.

Certain aspects of the present disclosure are directed towards a non-transitory computer-readable medium having stored thereon instructions that, when executed by one or more processors, cause the one or more processors to: determine an audio signal; output the audio signal; and establish a connection to a second device in response to outputting the audio signal.

Certain aspects of the present disclosure are directed towards an apparatus for wireless communication comprising: means for determining an audio signal; outputting the audio signal; and means for establishing a connection to a second device in response to outputting the audio signal.

In some aspects, one or more of the apparatuses described above is, can be part of, or can include a vehicle or component or system of a vehicle, a mobile device (e.g., a mobile telephone or so-called "smart phone" or other mobile device), an Internet-of-Things (IoT) device, an extended reality (XR) device (e.g., a virtual reality (VR) device, an augmented reality (AR) device, or a mixed reality (MR) device), a wearable device, a personal computer, a laptop computer, a tablet computer, a server computer, a robotics device or system, an aviation system, or other device. In some aspects, one or more of the apparatuses includes an image sensor (e.g., a camera) or multiple image sensors (e.g., multiple cameras) for capturing one or more images. In some aspects, one or more of the apparatuses includes one or more displays for displaying one or more images, notifications, and/or other displayable data. In some aspects, one or more of the apparatuses includes one or more speakers, one or more light-emitting devices, and/or one or more microphones. In some aspects, one or more of the apparatuses described above can include one or more sensors. For instance, the one or more sensors can include at least one of a light-based sensor (e.g., a LIDAR sensor, a radar sensor, etc.), an audio sensor, a motion sensor, a temperature sensor, a humidity sensor, an image sensor, an accelerometer, a gyroscope, a pressure sensor, a touch sensor, and a magnetometer. In some cases, the one or more sensors can be used for determining a location of the apparatuses, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 6 is a flow diagram illustrating an example process for wireless communication, in accordance with certain aspects of the present disclosure.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Systems, apparatuses, processes (also referred to as methods), and computer-readable media (collectively referred to herein as "systems and techniques") are described herein for wireless device connection and authentication. The aspects described herein are applicable to any wireless technology where source and sink devices are paired and establish a wireless connection for communication, including Bluetooth (BT) technology. Transferring a peripheral device from one already-paired host device to another may be complicated for users. For example, a user may have to turn off the connection technology feature (e.g., BT feature) of an already-paired host to transfer the connection from the paired host to another host. Moreover, any attacker with physical access to a peripheral may force the peripheral to pair with a host of their choice, allowing the attacker to use the device without the owner's consent, causing a security concern.

In some aspects of the present disclosure, an audio signal may be used as a data signal between the host and peripheral devices, simplifying the connection process and providing an authentication process to increase security. For example, an audio channel may be formed between the host and the peripheral distinct from the wireless channel (e.g., BT channel). The user may have the option to disable pairing altogether on a peripheral device so that the peripheral device only associates with a host device that sends the proper audio signal for authentication. The audio signal may be encrypted. Each time an audio signal is used for authentication, the audio signal may be different while still being unique to the host/peripheral pair. For example, the audio signal may be implemented with a time-based variation in a random seed used to generate the audio signal or a challenge-response protocol, as described in more detail herein.

Figure 1:
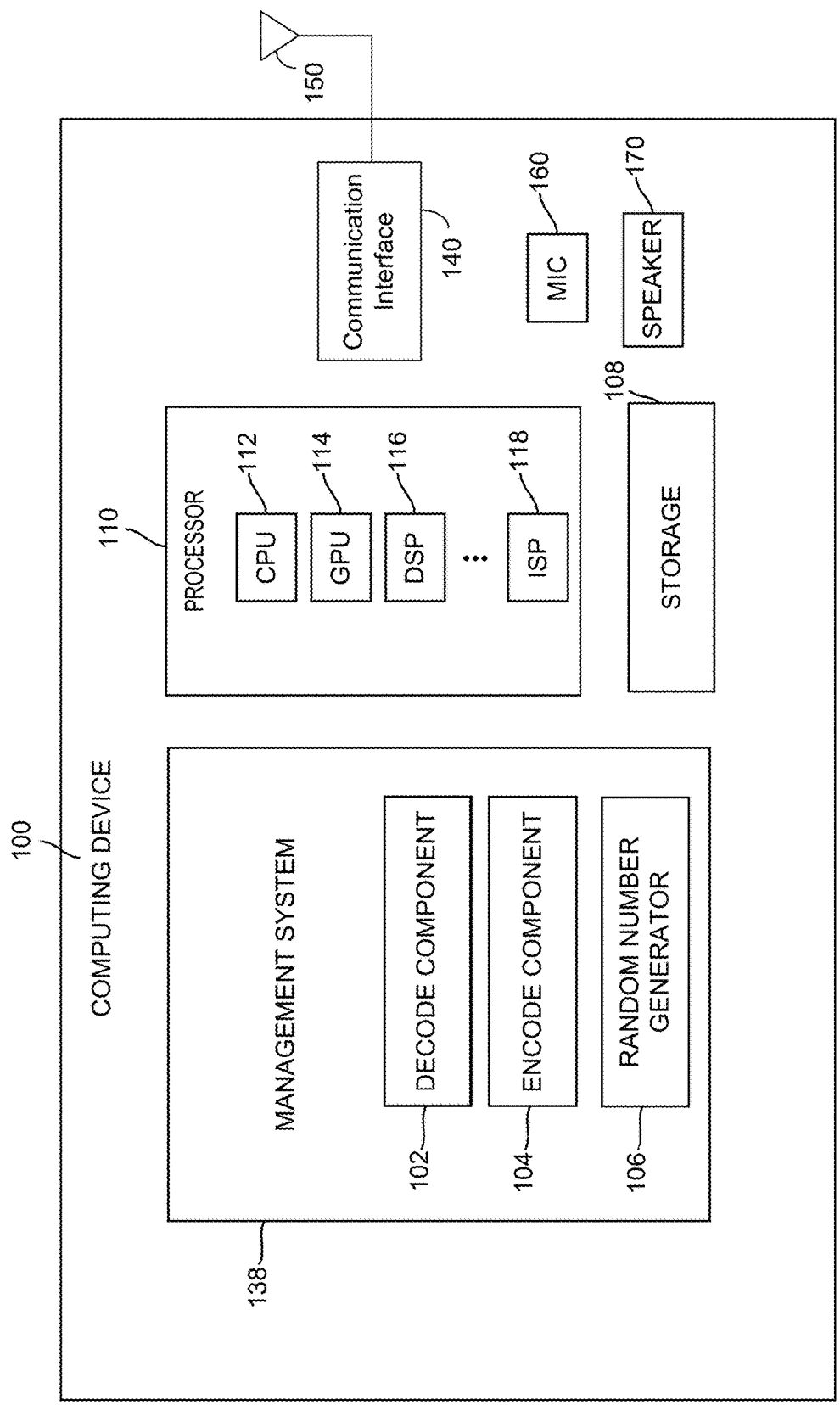
FIG. 1 is a diagram illustrating an example recording device, in accordance with some examples.

FIG. 1 is a diagram illustrating an example computing device 100, in accordance with some examples. In the example shown, the computing device 100 may include storage 108 and processor 110.

The storage 108 can include any storage device(s) for storing data. The storage 108 can store data from any of the components of the computing device 100. In some implementations, the processor 110 can include a central processing unit (CPU) 112, a graphics processing unit (GPU) 114, a digital signal processor (DSP) 116, and/or an image signal processor (ISP) 118. In some aspects, the computing device 100 includes a Bluetooth (BT) management system 138. The BT management system 138 may be implemented as part of the processor 110, in some aspects. The BT management system 138 may include a decode component 102 and an encode component 104. The encode component 104 may encode a value in an audio signal, which may be output (e.g., played) using a speaker 170 of the computing device 100. The audio signal may facilitate a connection to be established with a device. In some aspects, the management system 138 includes a random number generator 106. The random number generator 106 may generate a random number, which the encode component 104 may encode in the audio signal. In some aspects, the management system 138 may include a decode component 102. The decode component may receive an audio signal via the microphone 160, which may be used to establish a connection with a device.

In some aspects, the computing device may include a communication interface 140. The communication interface 140 may be used to communicate with a device using an established connection. For example, the communication interface may be a transceiver coupled to an antenna 150 for communication.

There are numerous wireless devices (e.g., BT devices) like earbuds, headsets, XR, smart glass, BT wearable, laptops, and tablets in the market. New use cases are becoming popular leading to each user having multiple devices, where the devices are interconnected, creating a complex connection topology. This complex connection topology creates a bad user experience with respect to the pairing of devices and subsequent reconnections. Some aspects of the present disclosure provide techniques for improving user experience and addressing security concerns.

Sink devices (e.g., also referred to as peripheral devices) generally connect to the last connected source device by default, which is not user friendly since a user may want the sink device to connect with some other source device. A user may switch off the central/source device to allow other paired devices to connect to the peripheral/sink device, creating a poor user experience. In some cases, a device must be put into pairing mode to connect to new device. To address this issue, some devices in the market either have a physical button to choose between two paired devices to connect to or support up to 2 device connections and allow one to be actively streaming music or a phone call. In both types of peripheral devices, the connection may be limited to 1 or 2 devices, beyond which there may be no scalable solution for handling multi-device connection scenarios to switch between devices seamlessly.

There is currently a lack of a seamless user authorization process for pairing (e.g., BT pairing). Current peripheral devices may be paired by anyone by putting the device into pairing mode even when the device is not owned by them, which may lead to unauthorized usage of personal devices. These devices may be costly, and to prevent unauthorized use (e.g., accidental or malicious), a user may want to secure and personalize these devices to prevent the devices from being used by others without the owner's knowledge. Certain aspects provide techniques for improving user experience when connecting devices and improving security of devices.

To improve user experience when connecting devices, a microphone of the device may be used to communicate with a sink device. When a user turns on any type of device such as earbuds, smart glass devices, or smartwatch devices, the device may use an existing always on voice (AoV) subsystem of the device (or turn on the microphone if the sink device doesn't support AoV) to listen for an encrypted audio signal. The audio signal may be in the form of a unique tone (e.g., dual-tone multi-frequency (DTMF) tone) or any audio at a certain frequency such as an audio within a frequency range that a human cannot but the microphone can hear. In some cases, the tone or audio may be preconfigured by the user when the source and sink devices are paired to allow for a secure pairing process. A user may use the DTMF tone or audio to send an audio signal from the source device (e.g., by pushing a button on the source device) to the sink so that the source device connects with the specific sink device intended by the user.

Figure 2:
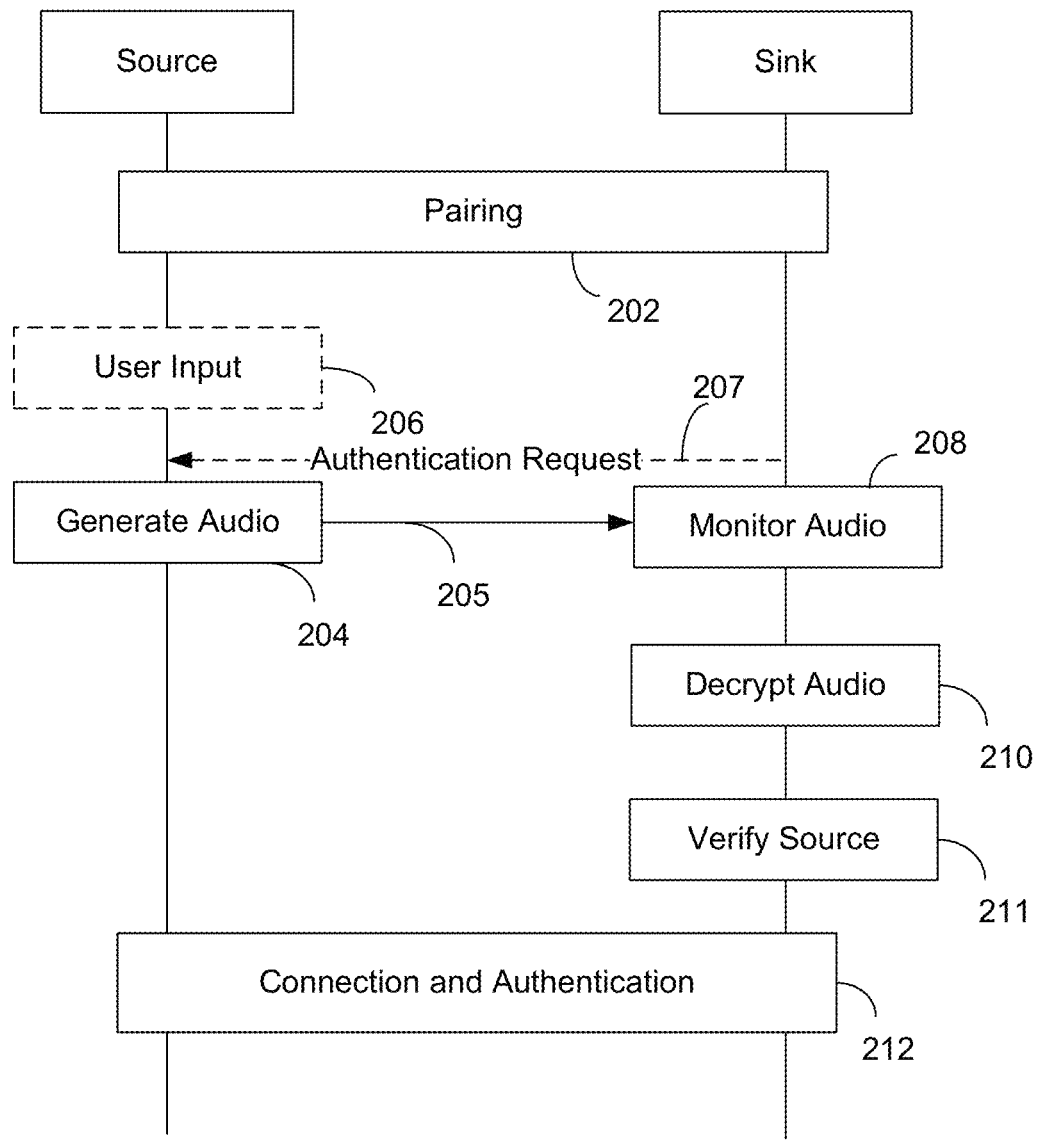
FIG. 2 illustrates example operations establishing a wireless connection using an audio signal, in accordance with certain aspects of the present disclosure.

FIG. 2 illustrates example operations establishing a connection using an audio signal, in accordance with certain aspects of the present disclosure. As shown, at block 202, a source device and a sink device may perform a pairing procedure. After the pairing procedure, the devices may disconnect. In some aspects of the present disclosure, an audio signal may be used for reconnection of the connection. For example, the sink device may enable a microphone of the sink device. Once the sink device (e.g., wireless earbuds or smart glass device) microphone is on, the source device may receive user input at block 206. For example, the user may click a icon on the source device (e.g., smartphone) which may output (e.g., play) an audio signal (e.g., any audio signal such as a unique encrypted tone).

At block 204, the source device may generate an audio signal 205. The sink device may monitor and receive the audio signal at block 208. At block 210, the sink device may decrypt the audio signal. For example, the sink device may capture the encrypted tone and decrypt the tone to determine that the received tone is from the source. The sink device may, at block 211, verify the source device based on a decrypted value associated with the audio signal. For example, the sink device may determine that the source device is a smartphone that is associated with (e.g., is the owner of) the sink device. The audio driver of the sink device may ask to connect directly to the smartphone, allowing for the authentication and connection of the devices at block 212.

The aspects described herein allow a first device to connect to a second device even when the device is already paired to a third device. For example, in some scenarios, the sink device (e.g., wireless earbuds) may be already connected with a source device (e.g., smartwatch or laptop) and the sink device may be in sniff mode. The user may want to use the same (already connected) sink device with the smartphone. The user may click the icon of the source device to output (e.g., play) a preconfigured encrypted DTMF tone or audio at a certain frequency. A sniff mode of a device refers to a power-saving mode where the device is less active and may only listen for transmissions at a set interval. The tone or audio may be captured through the sink device's microphone. The sink device identifies the DTMF tone or audio as belonging to the source device, facilitating the connection between the devices upon authenticating.

This unique DTMF tone may start with a header tone to avoid a false alarm on detection using always on voice (AoV) hardware block which implements a wake word engine (WWE) feature. For example, when the BT sink is turned on and in authentication mode, the WWE may monitor for the configured DTMF header followed by an encrypted random number (e.g., random number tone) that may be used for authentication. The sink device's microphone may be active for the WWE feature when the user turns on the sink device.

Figure 3:
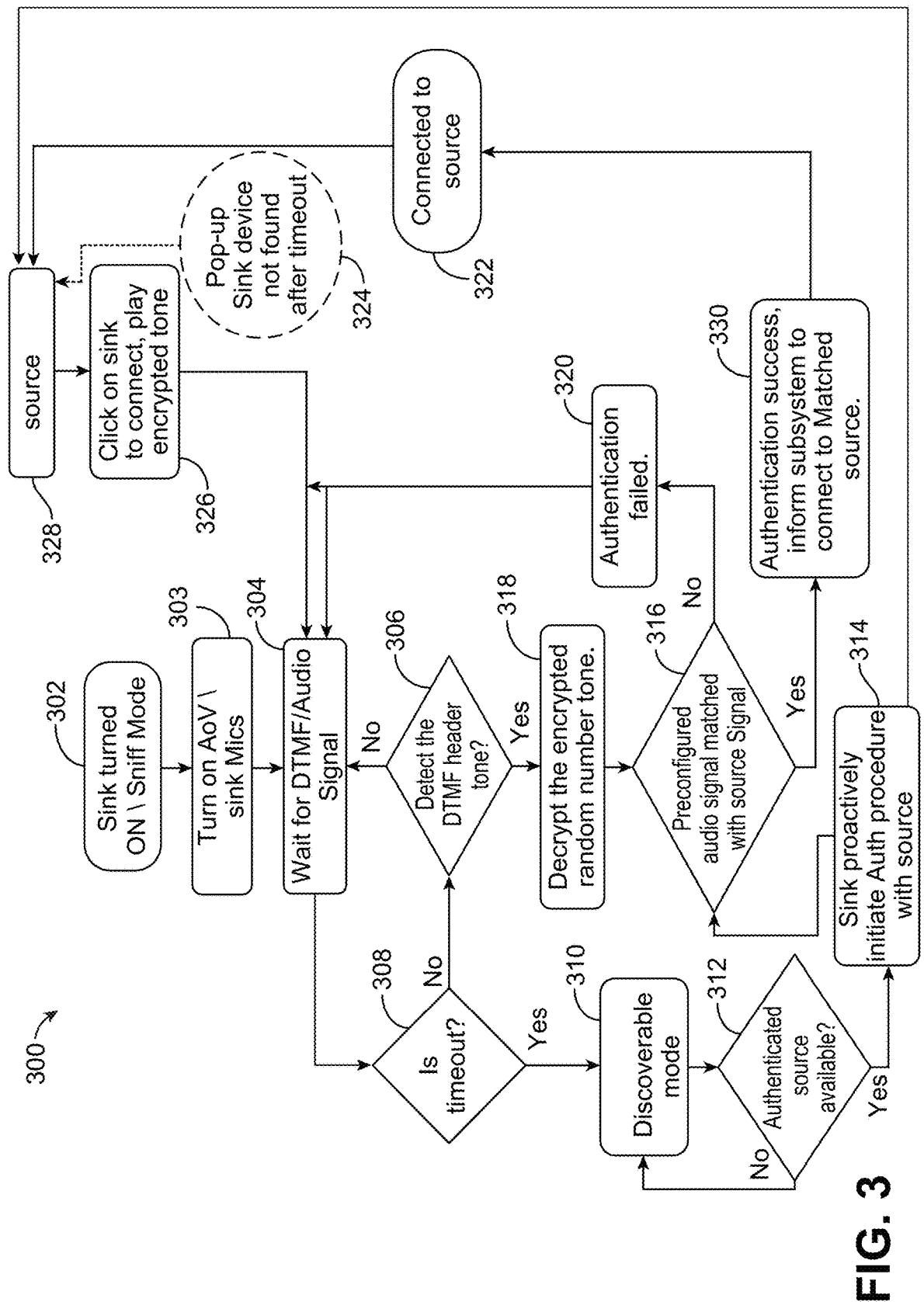
FIG. 3 illustrates example techniques for connecting devices using an audio signal, in accordance with certain aspects of the present disclosure.

FIG. 3 illustrates example techniques 300 for connecting devices using an audio signal, in accordance with certain aspects of the present disclosure. As shown, at block 302, a sink device may be turned on and configured in a sniff mode of operation. At block 303, the microphone of the sink device may be turned on. For example, the microphone may be turned on as part of an AoV process. At block 304, the sink device may wait for the audio signal. If, at block 308, a certain time expires and no audio signal is received, the sink device may proceed to block 310 and be configured in a discoverable mode. If, at block 306, the audio signal is received (e.g., a configured header tone of an audio signal is detected) from source device 328, the sink device may decrypt the audio signal (e.g., decrypt a random number tone for authentication, as described in more detail herein) at block 318, and determine, at block 316, whether the audio signal is associated with the source device for establishing a connection.

In some aspects, to output (e.g., play) the encrypted audio signal, at block 326, the user may click an icon on the source device 328 to connect and output the encrypted audio signal. If a response is not received and the sink device is not found, at block 324, a message may be indicated to the user on the source device 328 indicating that the sink device was not found.

As described, at block 316, the sink device may determine whether the audio signal is associated with the source device. If not, the authentication may fail at block 320; if so, at block 330, authentication is considered successful. The sink device may inform a sink device subsystem to connect to the matched source device, and at block 322, the sink device may connect to the source device. In some aspects, if after generating the audio signal, the source device 328 does not receive a response from a sink device for a period of time, a pop-up may occur on the source device indicating that a sink device was not found.

In some aspects, once the sink device is placed in discoverable mode at block 310, the sink device may determine, at block 312, whether an authenticated source device is available. If so, at block 314, the sink device may proactively initiate an authentication procedure with the source device. For example, the sink device (e.g., wireless earbuds) may be turned on by the user and may not receive a configured audio signal and a configured timer may expire. The sink device may then fall back to discoverable mode to find the source. If the sink device finds only one configured and authenticated source device (e.g., a smart phone or laptop) that is available, then the sink device may proactively initiate the authentication procedure by the source device. For example, the sink device may send an indication to the source device to output (e.g., play) the audio signal to initiate authentication and connection (e.g., without user intervention for authentication). For instance, as shown in FIG. 2, instead of receiving user input, the source device may receive an authentication request 207 from the sink device, requesting that the source device initiate the authentication procedure, including the source device outputting (e.g., playing) the audio signal, as described.

When a user pairs a sink device for the first time with a source device (e.g., a source device such as a smartphone), the user may have the option to disable the pairing mode of the sink device. The pairing mode may only be enabled in response to authentication by the source device (e.g., using a configured audio signal) so that only the owner of the sink device can use the device. If the source device is not available to enable the pairing mode of the sink device, the authentication information used to generate the audio signal may be stored in the cloud, allowing the user to use any other device to download the authentication information to generate the audio signal. For example, the user may want to use the sink device (e.g., earbuds) with a new source device (e.g., a television) which is available with an internet connection. In that case, the user may log in to a profile (e.g., a user profile on the cloud or on the source device) to download the authentication information and authenticate the sink device by outputting (e.g., playing) the encrypted audio signal at the source device.

As in many sink devices (e.g., headsets or gadgets), the microphone may be present and enabled for voice commands. Thus, the microphone may be used to capture the audio signal and perform authentication as described herein. It may be possible for audio signals to be captured and re-output (e.g., replayed) by an adversary's computing device, causing a security issue. To solve the security issue, random signals may be used, which may be configured in a manner such that the signal is only understood by a transmitter and receiver (e.g., source and sink devices). In some aspects, a DTMF tone may be output by the transmitter and may be captured by the receiver to authenticate whether the DTMF tone is generated using a particular random number. A pseudo-random number generator may be used in security applications where a random number is needed for encryption or specific purposes. For example, a transmitter and receiver may be configured with a same seed and same function to generate the random number. For instance, the sink device and source device may generate random numbers using the following equations:

$$\text{Seed}_{current} = (a * \text{seed}_{previous}) \bmod m;$$

$$\text{random} = \text{seed}_{current}/m;$$

where a and m are positive integers preconfigured at the source and sink devices. A random number may be generated based on a calculated seed (e.g., $\text{seed}_{current}$). A seed used to generate the random number may be recalculated so that a new seed is used when generating a subsequent random number. For example, a current seed ($\text{seed}_{current}$) may be calculated based on a previous seed (e.g., $\text{seed}_{previous}$). The transmitter may generate the random number and encode the random number as a DTMF tone. The transmitter may include a DTMF generator or may have tones saved locally for the random numbers for selection.

The receiver's microphone captures the DTMF tone and a processing unit runs a DTMF detection algorithm to decode the associated random number. Once the random number associated with the received DTMF tone has been decoded, the processing unit may run a random number generator (e.g., implemented similar to the random number generator of the transmitter) to generate a random number that should match the random number generated by the transmitter and encoded in the DTMF tone. The receiver may compare the decoded random number and the locally generated random number, and if the random numbers match, the receiver authenticates the DTMF tone and connects to the transmitter. Moreover, if the random numbers match, then the seed is updated at the receiver as described herein.

Figure 4:
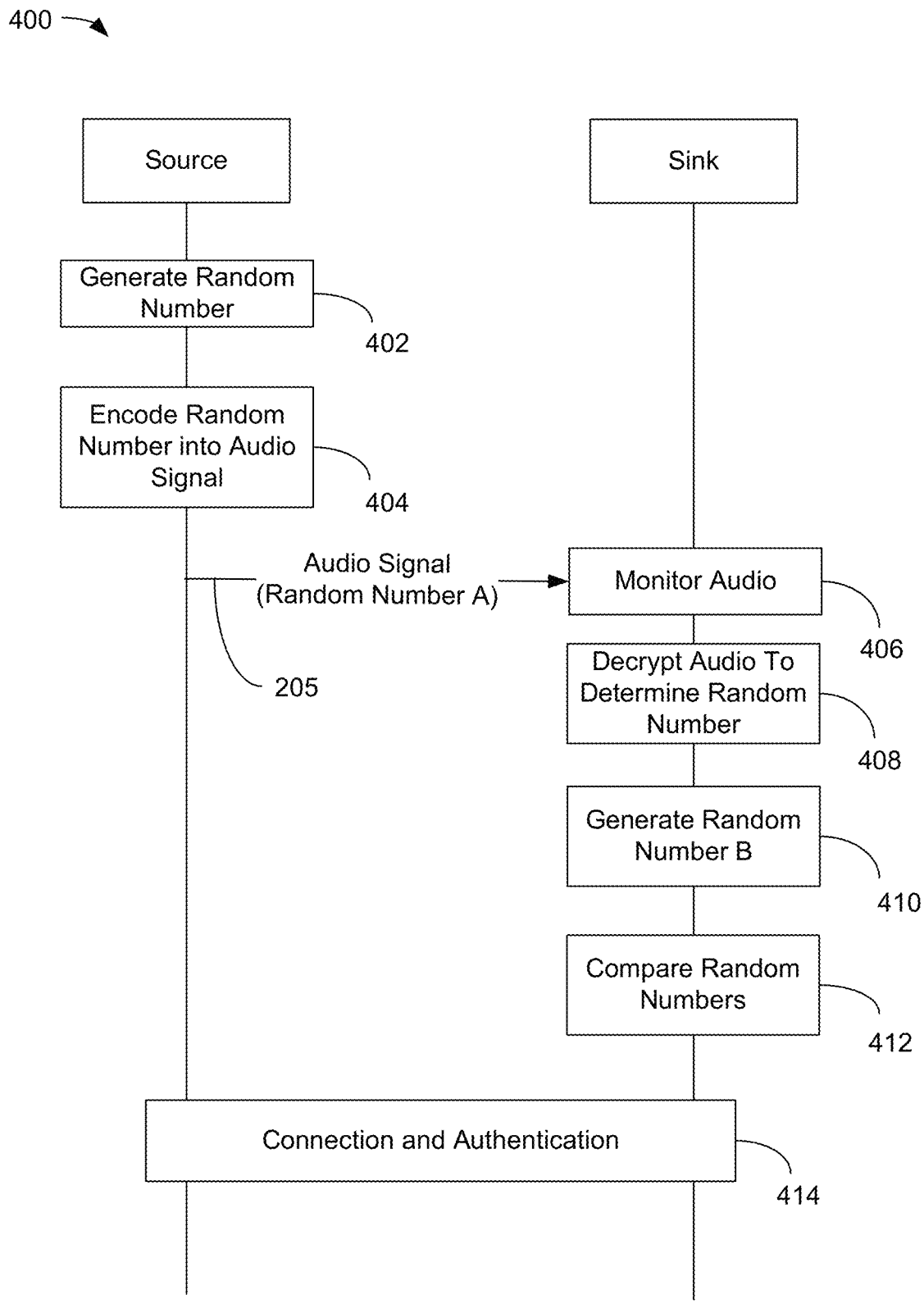
FIG. 4 illustrates example operations for device authentication, in accordance with certain aspects of the present disclosure.

FIG. 4 illustrates example operations 400 for device authentication, in accordance with certain aspects of the present disclosure. At block 402, the source device generates a random number A, and at block 404, encodes random number A onto an audio signal 205 (e.g., a DTMF tone). The audio signal 205 is then sent to the sink device via a speaker. As shown, at block 406, the sink device monitors for and receives the audio signal, and at block 408, decrypts the audio signal to determine random number A. For instance, the sink device may monitor for the unique DTMF tone generated bysource device so that sink device identifies the source device to connect. At block 410, the sink device generates a random number B using a same seed as used by the source device to generate random number A. Thus, random number A and random number B should match. At block 412, the sink device compares random number A and random number B, and if the random numbers match, the sink device performs connection and authentication procedures at block 414.

It is possible that the transmitter and receiver may become out of sync and generate different random numbers, preventing proper authentication. For example, if the transmitter keeps outputting tones for every random number generation, but the receiver is not able to detect the tone, then the current random number will be different for the transmitter and receiver. In some aspects, to prevent the devices becoming out of sync and improve security, a random number may be exchanged over a encrypted link after the devices have established a connection. The exchanged random number may be used for a subsequent connection attempt.

In other words, when attempting to establish a connection, the source generates the audio signal using the previously exchanged random number for authentications.

Figure 5:
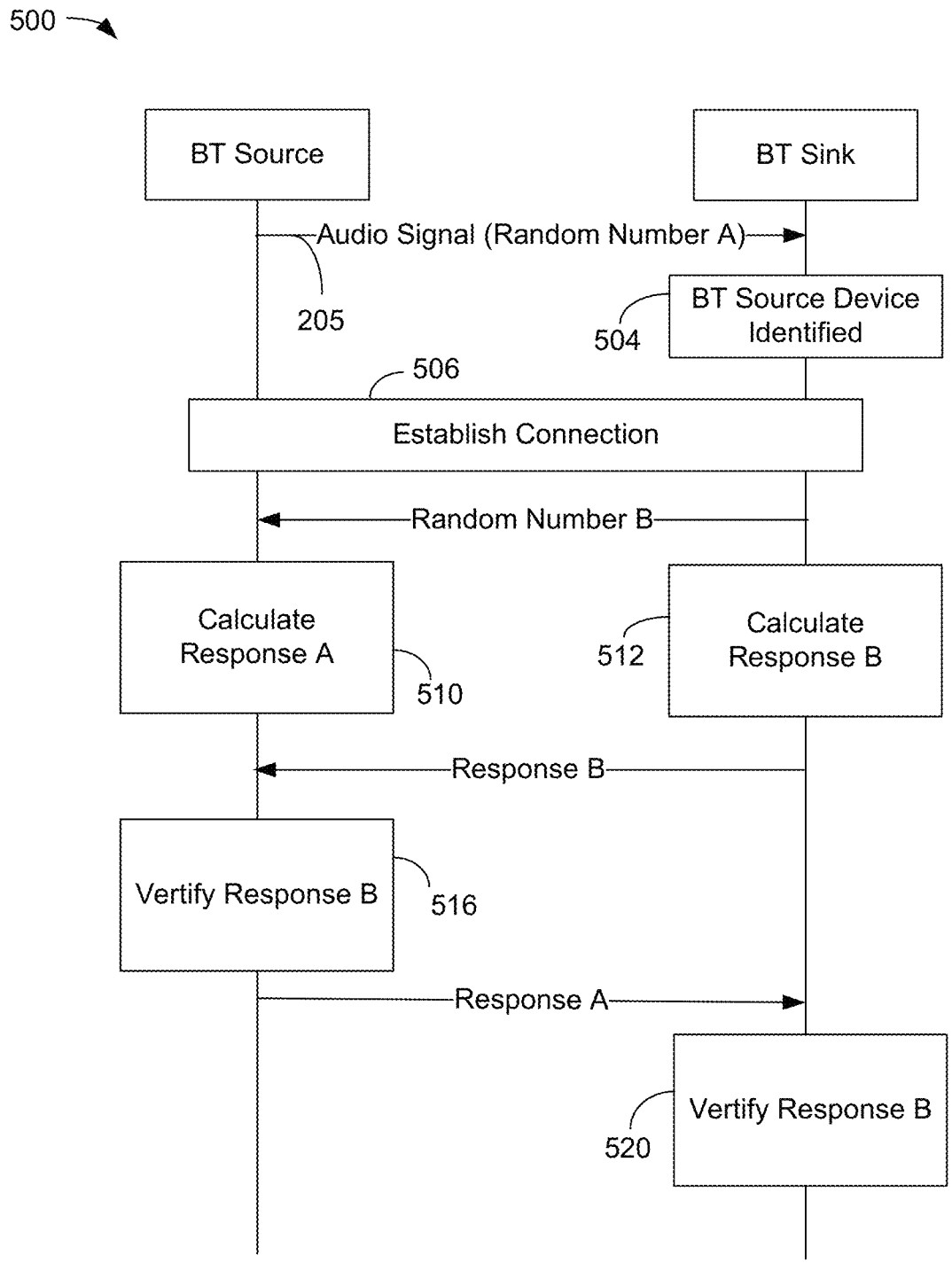
FIG. 5 illustrates example operations for device authentication using random numbers, in accordance with certain aspects of the present disclosure

FIG. 5 illustrates example operations 500 for device authentication, in accordance with certain aspects of the present disclosure. The sink device may monitor for a unique DTMF tone generated by source device so that sink device identifies the source device to connect. For example, the source device may send an audio signal 205 to the sink device with random number A encoded onto the audio signal. At block 504, the source device identifies the source device, and at block 506, establishes a connection between the source device and the sink device. The sink device may then generate random number B and transmit random number B to the source device using the established connection. At block 510, the source device may calculate a response (response A) using a hash function of a secret key, random number A, and random number B. Similarly, at block 512, the sink device may calculate a response (response B) using a hash function of the secret key, random number A, and random number B. The secret key may be any value which may be exchanged between the devices during the pairing procedure. At block 516, the source device may verify the response B using the secret key.

For example, source device may verify that response B matches response A which was calculated at block 510. Similarly, the source device may send response A to the sink device, and at block 520, the sink device may verify response A (e.g., verify that response A matches response B calculated at block 512). Thus, by exchanging random number B on the encrypted link, a mutual authentication procedure may occur. Communication may continue on the established connection if authentication is successful. If not successful, the connection may be disconnected.

FIG. 6 is a flow diagram illustrating an example process 600 for wireless communication, in accordance with certain aspects of the present disclosure. The operations of process 600 may be performed by a first device (e.g., a sink device), such as the computing device 100 of FIG. 1.

At block 602, the first device may receive, via a microphone, an audio signal from a second BT device. The audio signal may be a dual-tone multi-frequency (DTMF) tone that includes an encoded value or number. At block 604, the first device may decode the audio signal (e.g., audio signal 205) to determine an encoded value. For example, decoding the audio signal may involve decrypting the audio signal to determine the encoded value.

At block 606, the first device may determine (or verify) that the audio signal is associated with the second device (e.g., a source device) based on the encoded value. In some aspects, the first device may generate a first random number, and compare the encoded value to the first random number. Determining or verifying that the audio signal is associated with the second device may be based on the comparison. The encoded value may include a second random number. The first random number and the second random number may be generated using a same seed.

At block 608, the first device may connect to the second device based on determining/verifying that the audio signal is associated with the second device. In some aspects, the first device generates a first random number (e.g., random number B shown in FIG. 5), and sends an indication of the first random number to the second device via the connection to second device. The first device may receive a first response from the second device, the first response being associated with the first random number and verify the second device based on the first response. The encoded value may be a second random number (e.g., random number A shown in FIG. 5). The first device may generate a second response (e.g., response B shown in FIG. 5) based on the first random number and the second random number. Verifying the second device may include comparing the first response and the second response. In some aspects, the first device may generate the second response by performing a hash function based on a secret key, the first random number, and the second random number.

In some aspects, the first device sends or transmits an indication (e.g., authentication request 207) to the second device to output (e.g., play) the audio signal, where the audio signal is received in response to sending the indication. The first device may perform a search of paired devices. The indication to the second device may be sent based on the second device being the only device found when performing the search.

Figure 7:
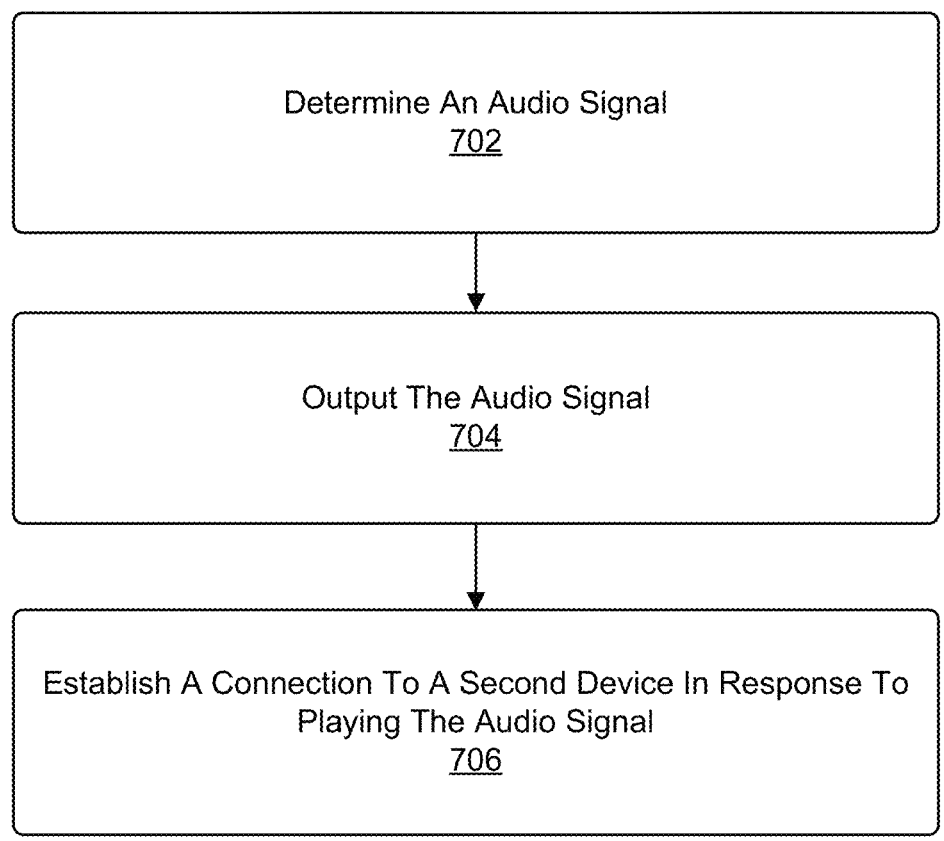
FIG. 7 is a flow diagram illustrating an example process for wireless communication, in accordance with certain aspects of the present disclosure.

FIG. 7 is a flow diagram illustrating an example process 700 for wireless communication, in accordance with certain aspects of the present disclosure. The operations of process 700 may be performed by a first device (e.g., a source device), such as the computing device 100 of FIG. 1.

At block 702, the first device determines an audio signal (e.g., a DTMF tone) to be output (e.g., played with a speaker). In some aspects, at block 704, the first device outputs (e.g., plays) the audio signal to connect with a second Bluetooth device. In some aspects, the first device receives a user input (e.g., as described with respect to block 206 of FIG. 2). The audio signal may be output in response to the user input. In some aspects, the first device may generate a random number. Determining the audio signal may include encoding the random number onto the audio signal.

At block 706, the first device establishes a connection to the second Bluetooth device in response to outputting (e.g., playing) the audio signal. In some aspects, the first device may receive an indication of a first random number from the second device via the established connection, and generate a first response to the second device based on the first random number. The first device may send the first response to the second device. In some aspects, determining the audio signal may include encoding a second random number in the audio signal, where the first response is generated based on the first random number and the second random number. In some aspects, generating the first response may include performing a hash function based on a secret key, the first random number, and the second random number. The first device may receive, from the second device and after outputting (e.g., playing) the audio signal, a second response. The first device may verify that the second response is from the second device by comparing the first response and the second response.

In some aspects, the first device receives an indication (e.g., authentication request 207) from the second device to output (e.g., play) the audio signal. The audio signal is output in response to sending the indication.

Figure 8:
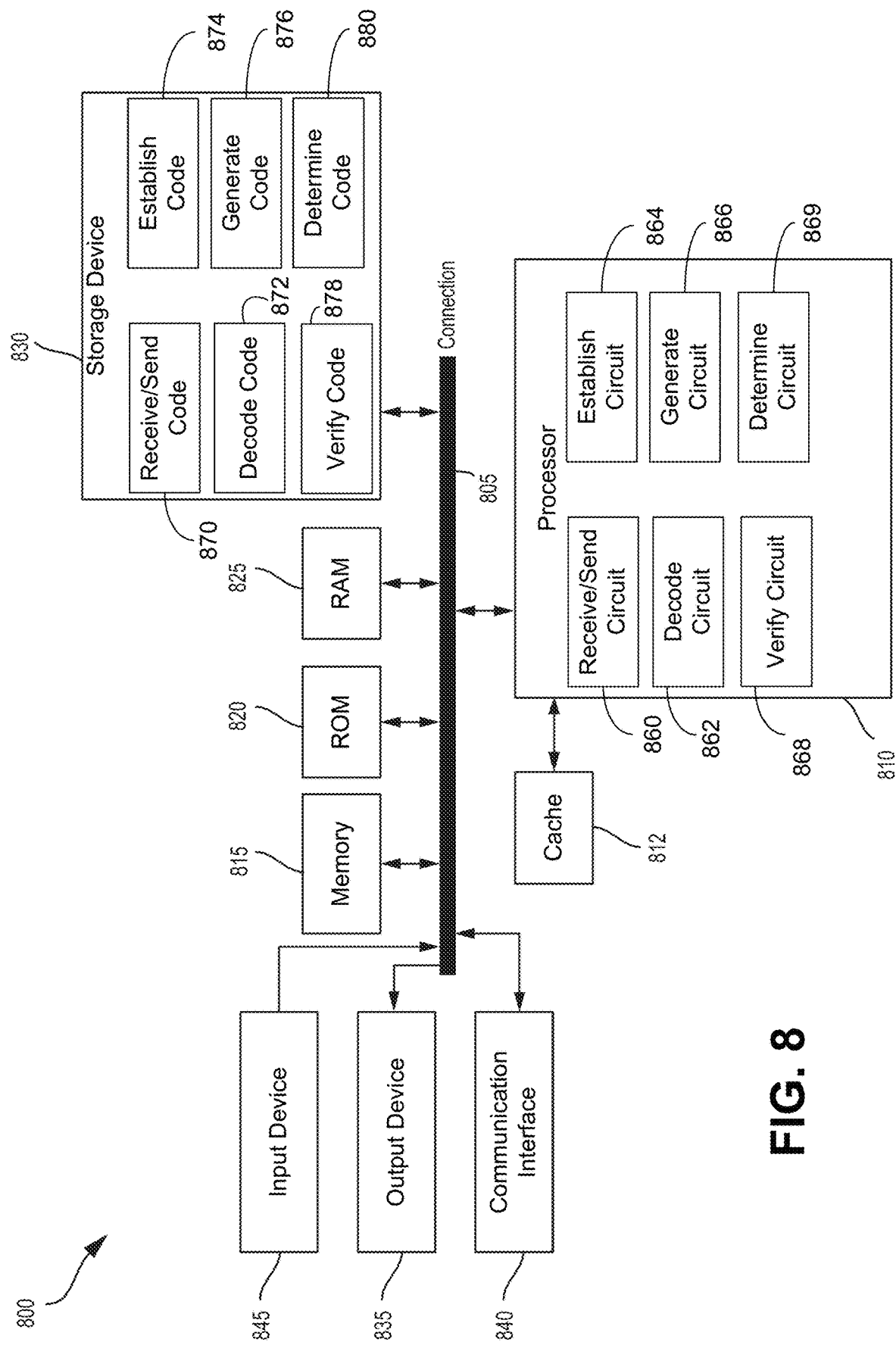
FIG. 8 is a diagram illustrating an example of a system for implementing certain aspects of the present technology.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some aspects, computing system 800 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service. In some aspects, code stored in storage device 830 may be configured to control processor 810 to perform operations described herein. In some aspects, the processor 810 may be a special-purpose processor where instructions or circuitry are incorporated into the actual processor design to perform the operations described herein. Processor 810 may essentially be a completely self-contained computing system, containing multiple cores or processors, a bus, memory controller, cache, etc. A multi-core processor may be symmetric or asymmetric. The processor 810 may include circuit 860 for receiving/sending, circuit 862 for decoding, circuit 864 for establishing, circuit 866 for generating, circuit 868 for verifying, and circuit 869 for determining.

The storage device 830 may store code which, when executed by the processors 810, performs the operations described herein. For example, the storage device 830 may include code 870 for receiving/sending, code 872 for decoding, code 874 for establishing, code 876 for generating, code 878 for generating, and code 880 for determining.

To enable user interaction, computing system 800 includes an input device 845, which can represent any number of input mechanisms, such as a microphone for speech, a camera for generating images or video, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some aspects, a hardware service that performs a particular function can include the software component stored in a computer-readable medium in connection with the necessary hardware components, such as processor 810, connection 805, output device 835, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for wireless communication, comprising: at least one memory; and one or more processors coupled to the at least one memory and configured to: receive, via a microphone, an audio signal from a device; decode the audio signal to determine an encoded value; determine that the audio signal is associated with the device based on the encoded value; and establish a connection to the device based on determining that the audio signal is associated with the device.

Aspect 2. The apparatus of aspect 1, wherein the audio signal comprises a dual-tone multi-frequency (DTMF) tone.

Aspect 3. The apparatus of any one of aspects 1-2, wherein the one or more processors are further configured to: generate a first random number; and compare the encoded value to the first random number, wherein verifying that the audio signal is associated with the device is based on the comparison.

Aspect 4. The apparatus of aspect 3, wherein the value comprises a second random number, and wherein the first random number and the second random number are generated using a same seed.

Aspect 5. The apparatus of any one of aspects 3-4, wherein the one or more processors are further configured to exchange a random number with the device to be used for a future wireless connection attempt.

Aspect 6. The apparatus of any one of aspects 1-5, wherein the one or more processors are further configured to: generate a first random number; send an indication of the first random number to the device via the established connection to the device; receive a first response from the device, the first response being associated with the first random number; and verify the device based on the first response.

Aspect 7. The apparatus of aspect 6, wherein: the encoded value comprises a second random number; the one or more processors are further configured to generate a second response based on the first random number and the second random number; and to verify the device, the one or more processors are configured to compare the first response and the second response.

Aspect 8. The apparatus of aspect 7, wherein, to generate the second response, the one or more processors are configured to perform a hash function based on a secret key, the first random number, and the second random number.

Aspect 9. The apparatus of any one of aspects 1-8, wherein the one or more processors are further configured to send an indication to the device to output the audio signal, wherein the audio signal is received in response to sending the indication.

Aspect 10. The apparatus of aspect 9, wherein the one or more processors are further configured to perform a search of paired devices, wherein the indication to the device is sent based on the device being the only device found when performing the search.

Aspect 11. The apparatus of any one of aspects 1-10, wherein the apparatus is configured as a sink device, and wherein the device is configured as a source device.

Aspect 12. The apparatus of any one of aspects 1-11, wherein the audio signal is received while the apparatus is connected to a third device.

Aspect 13. The apparatus of any one of aspects 1-12, wherein the audio signal is received while pairing is disabled for the apparatus.

Aspect 14. The apparatus of any one of aspects 1-13, wherein, to establish the connection, the one or more processors are configured to establish a Bluetooth (BT) connection.

Aspect 15. An apparatus for wireless communication, comprising: at least one memory; and one or more processors coupled to the at least one memory and configured to: determine an audio signal; output the audio signal; and establish a connection to a device in response to outputting the audio signal.

Aspect 16. The apparatus of aspect 15, wherein the audio signal comprises a dual-tone multi-frequency (DTMF) tone.

Aspect 17. The apparatus of any one of aspects 15-16, wherein the one or more processors are further configured to receive a user input, wherein the audio signal is output in response to the user input.

Aspect 18. The apparatus of any one of aspects 15-17, wherein: the one or more processors are further configured to generate a random number; and to determine the audio signal, the one or more processors are configured to encode the random number onto the audio signal.

Aspect 19. The apparatus of any one of aspects 15-18, wherein the one or more processors are further configured to: receive an indication of a first random number from the device via the established connection; generate a first response to the device based on the first random number; and send the first response to the device.

Aspect 20. The apparatus of aspect 19, wherein, to determine the audio signal, the one or more processors are configured to encode a second random number in the audio signal, wherein the first response is generated based on the first random number and the second random number.

Aspect 21. The apparatus of aspect 20, wherein, to generate the first response, the one or more processors are configured to perform a hash function based on a secret key, the first random number, and the second random number.

Aspect 22. The apparatus of any one of aspects 20-21, wherein the one or more processors are further configured to: receive, from the device and after outputting the audio signal, a second response; and determine that the second response is from the second device by comparing the first response and the second response.

Aspect 23. The apparatus of any one of aspects 15-22, wherein the one or more processors are further configured to receive an indication from the device to output the audio signal, wherein the audio signal is output in response to receiving the indication.

Aspect 24. The apparatus of any one of aspects 15-23, wherein, to establish the connection, the one or more processors are configured to establish a Bluetooth (BT) connection.

Aspect 25. A method for wireless communication by a first device, comprising:
receiving, via a microphone, an audio signal from a second device; decoding the audio signal to determine an encoded value; determining that the audio signal is associated with the second device based on the encoded value; and establishing a connection to the second device based on determining that the audio signal is associated with the second device.

Aspect 26. The method of aspect 25, wherein the audio signal comprises a dual-tone multi-frequency (DTMF) tone.

Aspect 27. The method of any one of aspects 25-26, further comprising: generating a first random number; and comparing the encoded value to the first random number, wherein verifying that the audio signal is associated with the second device is based on the comparison.

Aspect 28. The method of aspect 27, wherein the value comprises a second random number, and wherein the first random number and the second random number are generated using a same seed.

Aspect 29. The method of any one of aspects 27-28, further comprising exchanging a random number with the second device to be used for a future wireless connection attempt.

Aspect 30. The method of any one of aspects 25-29, further comprising: generating a first random number; sending an indication of the first random number to the second device via the established connection to second BT device; receiving a first response from the second BT device, the first response being associated with the first random number; and verifying the second BT device based on the first response.

Aspect 31. The method of aspect 30, wherein: the encoded value comprises a second random number; and the method further comprises: generating a second response based on the first random number and the second random number; and comparing the first response and the second response to verify the second BT device.

Aspect 32. The method of aspect 31, wherein generating the second response comprises performing a hash function based on a secret key, the first random number, and the second random number.

Aspect 33. The method of any one of aspects 25-32, further comprising sending an indication to the second device to output the audio signal, wherein the audio signal is received in response to sending the indication.

Aspect 34. The method of aspect 33, further comprising performing a search of paired devices, wherein the indication to the second device is sent based on the second device being the only device found when performing the search.

Aspect 35. The method of any one of aspects 25-34, wherein the first device is configured as a sink device, and wherein the second device is configured as a source device.

Aspect 36. The method of any one of aspects 25-35, wherein the audio signal is received while the first device is connected to a third device.

Aspect 37. The method of any one of aspects 25-36, wherein the audio signal is received while pairing is disabled for the first device.

Aspect 38. The method of any one of aspects 25-37, wherein establishing the connection comprises establishing a Bluetooth (BT) connection.

Aspect 39. A method for wireless communication by a first device, comprising:
determining an audio signal; outputting the audio signal; and establishing a connection to a second device in response to outputting the audio signal.

Aspect 40. The method of aspect 39, wherein the audio signal comprises a dual-tone multi-frequency (DTMF) tone.

Aspect 41. The method of any one of aspects 39-40, further comprising receiving a user input, wherein the audio signal is output in response to the user input.

Aspect 42. The method of any one of aspects 39-41, wherein: the method further comprises generating a random number; and determining the audio signal comprises encoding the random number onto the audio signal.

Aspect 43. The method of any one of aspects 39-42, further comprises: receiving an indication of a first random number from the second device via the established connection; generating a first response to the second device based on the first random number; and sending the first response to the second device.

Aspect 44. The method of aspect 43, wherein determining the audio signal comprises encoding a second random number in the audio signal, wherein the first response is generated based on the first random number and the second random number.

Aspect 45. The method of aspect 44, wherein generating the first response performing a hash function based on a secret key, the first random number, and the second random number.

Aspect 46. The method of any one of aspects 44-45, further comprising: receiving, from the second device and after outputting the audio signal, a second response; and determining that the second response is from the second device by comparing the first response and the second response.

Aspect 47. The method of any one of aspects 39-46, further comprising receiving an indication from the second device to output the audio signal, wherein the audio signal is output in response to receiving the indication.

Aspect 48. The method of any one of aspects 39-47, wherein establishing the connection comprises establishing a Bluetooth (BT) connection.

Aspect 49. A non-transitory computer-readable medium having stored thereon instructions that, when executed by one or more processors, cause the one or more processors to perform operations according to any of aspects 1 to 48.

Aspect 50. An apparatus for wireless communication, the apparatus including one or more means for performing operations according to any of aspects 1 to 48.

What is claimed is:

1. An apparatus for wireless communication, comprising:
at least one memory; and
one or more processors coupled to the at least one memory and configured to:
receive, via a microphone, an audio signal from a device, wherein the audio signal includes a header tone configured by the device and an encoded value;
decode the audio signal based on the header tone to determine the encoded value;
determine, based on a comparison of the encoded value to a first number generated by the apparatus, that the audio signal is associated with the device and that the device is approved to connect to the apparatus;
establish a connection to the device based on determining that the audio signal is associated with the device; and
verify identity of the device based on a first response of the device, wherein the first response includes a hash of the encoded value, the first number generated by the apparatus, and a second number generated using a same seed as the first number.

2. The apparatus of claim 1, wherein the audio signal comprises a dual-tone multi-frequency (DTMF) tone.

3. The apparatus of claim 1, wherein the one or more processors are further configured to exchange a number with the device to be used for a future wireless connection attempt.

4. The apparatus of claim 1, wherein:
the encoded value comprises the second number;
the one or more processors are further configured to generate a second response based on the first number and the second number; and
to verify the device is allowed to connect to the apparatus, the one or more processors are configured to compare the first response and the second response.

5. The apparatus of claim 4, wherein, to generate the second response, the one or more processors are configured to perform a hash function based on a secret key, the first number, and the second number.

6. The apparatus of claim 1, wherein the one or more processors are further configured to send an indication to the device to output the audio signal, wherein the audio signal is received in response to sending the indication.

7. The apparatus of claim 6, wherein the one or more processors are further configured to perform a search of paired devices, wherein the indication to the device is sent based on the device being the only device found when performing the search.

8. The apparatus of claim 1, wherein the apparatus is configured as a sink device, and wherein the device is configured as a source device.

9. The apparatus of claim 1, wherein the audio signal is received while the apparatus is connected to a third device.

10. The apparatus of claim 1, wherein the audio signal is received while pairing is disabled for the apparatus.

11. The apparatus of claim 1, wherein, to establish the connection, the one or more processors are configured to establish a Bluetooth (BT) connection.

12. An apparatus for wireless communication, comprising:
at least one memory; and
one or more processors coupled to the at least one memory and configured to:
determine an audio signal, wherein the audio signal includes a header tone configured by the apparatus and an encoded value;
output the audio signal to a device configured to decode the audio signal and determine, based on a comparison of the encoded value and a first number generated by the device, that the device is approved to connect to the apparatus;
establish a connection to the device in response to outputting the audio signal; and
transmit a first response to the device, the first response including a hash of the encoded value, the first number, and a second number generated using a same seed as the first number.

13. The apparatus of claim 12, wherein the one or more processors are further configured to receive a user input, wherein the audio signal is output in response to the user input.

14. The apparatus of claim 12, wherein:
the one or more processors are further configured to generate the second number; and
to determine the audio signal, the one or more processors are configured to encode the second number onto the audio signal.

15. The apparatus of claim 12, wherein the one or more processors are further configured to:
receive an indication of the first number from the device via the established connection; and
generate the first response to the device based on the first number.

16. The apparatus of claim 15, wherein, to determine the audio signal, the one or more processors are configured to encode the second number in the audio signal, wherein the first response is generated based on the first number and the second number.

17. The apparatus of claim 16, wherein, to generate the first response, the one or more processors are configured to perform a hash function based on a secret key, the first number, and the second number.

18. The apparatus of claim 16, wherein the one or more processors are further configured to:
receive, from the device and after outputting the audio signal, a second response; and
determine that the second response is from the device by comparing the first response and the second response.

19. The apparatus of claim 12, wherein the one or more processors are further configured to receive an indication from the device to output the audio signal, wherein the audio signal is output in response to receiving the indication.

20. The apparatus of claim 12, wherein, to establish the connection, the one or more processors are configured to establish a Bluetooth (BT) connection.

21. A method for wireless communication by a first device, comprising:
- receiving, via a microphone, an audio signal from a second device, wherein the audio signal includes a header tone configured by the second device and an encoded value;
- decoding the audio signal based on the header tone to determine the encoded value;
- determining, based on a comparison of the encoded value to a first number generated by the first device, that the audio signal is associated with the second device and that the first device is approved to connect to the second device;
- establishing a connection to the second device based on determining that the audio signal is associated with the second device; and
- verifying identity of the second device based on a first response of the second device, wherein the first response includes a hash of the encoded value, the first number generated by the first device, and a second number generated using a same seed as the first number.

22. The method of claim 21, wherein the audio signal comprises a dual-tone multi-frequency (DTMF) tone.

23. The method of claim 21, wherein the encoded value comprises the second number, and wherein the first number and the second number are generated using the same seed.

24. A method for wireless communication by a first device, comprising:
- determining an audio signal, wherein the audio signal includes a header tone configured by the first device and an encoded value;
- outputting the audio signal to a second device configured to decode the audio signal and determine, based on a comparison of the encoded value and a first number generated by the second device, that the second device is approved to connect to the first device;
- establishing a connection to the second device in response to outputting the audio signal; and
- transmitting a first response to the second device, the first response including a hash of the encoded value, the first number, and a second number generated using a same seed as the first number.

25. The apparatus of claim 1, wherein the one or more processors are configured to output data received via the connection to the device.

26. The apparatus of claim 1, wherein, upon establishing the connection, the one or more processors are configured to:
- receive, via the device, audio data to present; and
- output, via a speaker, the audio data.

* * * * *